United States Patent
Saveliev

[11] 3,768,538
[45] Oct. 30, 1973

[54] WHEEL RIM FOR PNEUMATIC TYRE

[76] Inventor: Gennady Vasilievich Saveliev, Ulitsa Energetikov, 10, kv. 23, Chelyabinsk, U.S.S.R.

[22] Filed: Aug. 9, 1971

[21] Appl. No.: 170,150

[52] U.S. Cl. .............................. 152/410, 152/396
[51] Int. Cl. .............................................. B60c 5/16
[58] Field of Search ................... 152/405, 406, 407, 152/408, 409, 410, 411, 412, 413, 414, 379, 381, 382, 393, DIG. 9, DIG. 10

[56] References Cited
UNITED STATES PATENTS
2,012,240  11/1935  Main .............................. 152/381 X
1,961,095  5/1934  Baker et al. ..................... 152/410 X

FOREIGN PATENTS OR APPLICATIONS
593,545  3/1960  Canada ............................. 152/381
686,145  1/1953  Great Britain ................ 152/DIG. 9
1,449,826  7/1966  France ................................ 152/381

*Primary Examiner*—Albert J. Makay
*Attorney*—Eric H. Waters et al.

[57] ABSTRACT

The wheel rim has face side flanges adjoining the seating surfaces for setting thereon the bases of the tyre beads.

These seating surfaces are shaped as convex rollers whose apices are located under the middle zone of the bases of the tyre beads, while the slopes of these rollers are directed to the side flanges and gradually transform into recesses, in which stick the heels of the bases of the tyre beads, thus providing for reliable fixing of the tyre on the wheel rim.

2 Claims, 1 Drawing Figure

PATENTED OCT 30 1973  3,768,538
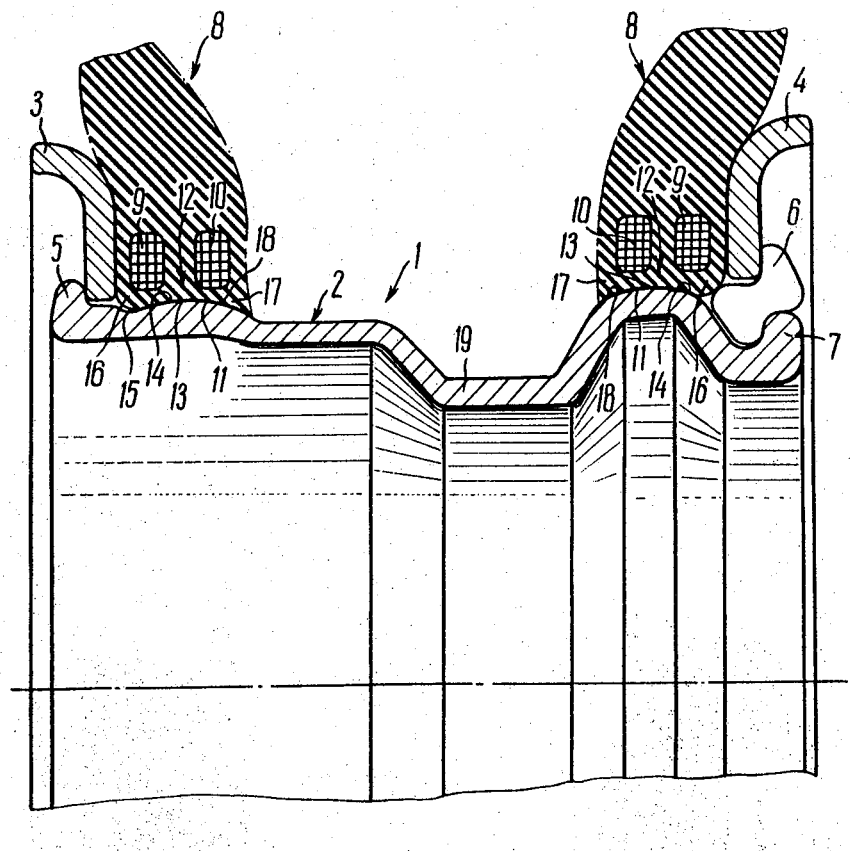

3,768,538

WHEEL RIM FOR PNEUMATIC TYRE

The present invention relates to wheel production in the automobile and tractor industry and, more particularly, it relates to wheel rims for pneumatic tyres.

The proposed wheel rims can be most successively used in wheel-tyre vehicles during the operation of which there may appear a necessity in movement with a reduced air pressure in the tyres, while providing a maximum braking and tractive efforts on the wheels.

For example, the rims according to the present invention may find applications in wheels of high-speed automobiles, in which a reduced pressure in the tyres may otherwise lead to "trickling" of the tyres from the seating surfaces of the wheel rims, thus hindering safe braking and stopping the automobile.

The proposed wheel rims will also find application in truck tractors whose wheels develop a maximum torque determined by the engagement of the tyres with the ground at a reduced air pressure within the tyres.

The known wheel rims for pneumatic tyres have on their faces side flanges on which rest the beads of the tyre. The side flanges adjoin seating surfaces intended for mounting thereon the bases of the tyre heads. These seating surfaces are usually made conical with a slope into the wheel rim.

In such constructions of wheel rims spacer rings mounted within the tyre between its beads are used for preventing "trickling" of the beads from the seating surface of the rim and turning them relative to the rim (at a reduced air pressure inside the tyre).

Such mounting of a tyre on a wheel rim is disadvantageous in that it requires a sectional construction of the rim, in which the sections are interconnected through a great number of bolts.

Production of such wheel rims is associated with a high consumption of labour, they are unreliable in operation and intricate in servicing. For tubeless tyres such wheel rims are practically useless.

Also known in the art are constructions of wheel rims, in which the tyre beads are secured on the conical seating surfaces through cylindrical portions or counterslopes within the zone of the noses of the bases of the tyre beads which increases the tension in this zone.

Such mounting of the tyre beads on the tyre rim hinders mounting and dismantling of the tyre, and in the case of using tubeless-type tyres it may result in a leakage of air from the pressure space due to breaking of the nose of the tyre bead.

An object of the present invention is to provide a wheel rim for a pneumatic tyre the construction of which whould ensure reliable mounting of the tyre without turning about the rim or "trickling" of its beads from the seating surfaces of the rim in the case of a reduced air pressure within the inner space of the tyre, both of tube or tubeless types, so that the operational characteristics of the wheel as a whole are considerably improved.

Another object of the invention is to facilitate mounting and dismantling of the tyre and to reduce the cost of production.

These and other objects are attained by providing a wheel rim for a pneumatic tyre with side flanges on its faces on which are supported the tyre beads and with seating surfaces adjoining these flanges and supporting their bases, in which, according to the invention, the seating surfaces are made in the form of convex rollers whose apices are located under the medium zone of the bases of the tyre beads between their carcass rings, while the slopes of these rollers directed to the side flanges gradually transform into recesses for catching the heels of the bases of the tyre beads.

The rollers are preferably made as toroids.

Such a construction of the wheel rim contributes to reliable holding of the tyre beads in place preventing "trickling"of these beads from the seating surfaces of the rim even at a reduced intertyre pressure and under the effect of side forces and moments on the wheel.

Furthermore, the process of mounting and dismantling of the wheel is considerably facilitated.

The invention will be better understood upon a consideration of one embodiment thereof, reference being made to the accompanying drawing illustrating a partial sectional view of a wheel rim of a lorry provided with a tubeless pneumatic tyre which is not completely shown.

The wheel rim 1 comprises a base 2 with removable side flanges 3 and 4 on its faces, one of which, the flange 3 rests on the shoulder 5 of the base 2 of the rim 1, while the flange 4 bears on a split lock ring 6, which, in turn, bears on the other shoulder 7 of the base 2 of the rim 1.

A pneumatic tyre is put on the base 2 of the wheel rim 1, the flanges of the tyre bearing on side flanges 3 and 4 of the base 2 of the rim 1 and having inner and outer carcass rings 9 and 10, respectively, disposed near the bases 11 of the flanges 8 of the tyre.

Adjoining the side flanges 3 and 4 of the rim 1 are seating surfaces 12, on which there are mounted bases 11 of the flanges 8 of the pneumatic tyre. The seating surfaces 12 are made in the form of convex rollers whose apices (the portions which are most spaced from the axis of rotation of the wheel) are located under the medium zone of the bases 11 of the flanges 8 of the tyre between the inner and outer carcass rings 9 and 10 of the flanges of the tyre. The slopes 14 of these rollers directed to the side flanges 3 and 4 are gradually transformed into recesses 15, in which there are caught the heels 16 of the bases 11 of the beads 8 of the tyre located above the outer carcass rings 9.

The noses 17 of the bases of the beads 8 of the tyre are disposed at the opposite slopes 18 of the rollers which gradually descend to the cylindrical portion of the base 2 of the rim 1.

The rollers of the seating surfaces 12 may be of any convex shape, but they are preferably shaped as a toroid.

In order to facilitate the assembly of the wheel, the base 2 of its rim 1 is equipped with a recess or a mounting groove 19.

The rim 1 is assembled with the tyre as follows.

The inner side flange 3 is put on the base 2 of the rim 1, and both beads 8 of the tyre are alternatively introduced into the mounting groove 19 of the base 2, then the second side flange 4 is put on and is locked by the split locking ring 6.

Thereafter, compressed air is forced into the air space of the tyre. As fast as the tyre is filled with air, its beads 8 tighten and set with their bases 11 on the seating surfaces 12 of the base 2 of the wheel rim 1.

At the initial moment, before passing the apices 13 of the seating surfaces 12, the tightening of the heels 16 of the bases 12 of the beads 8 is increased. Then the heels 16 stick in the recess 15 of the bases 2 and are held there by the outer carcass rings 9 preventing self-trickling of the beads 8 of the tyre from the seating surfaces 12 of the rim 1. When the air pressure in the tyres is reduced during the rolling of the wheel, the tightening of the bases 11 of the beads 8 of the tyre under the outer carcass rings 9 increases still further.

The middle zone of the bases 11 of the beads 8 of the tyre between its carcass rings 9 and 10 and the inner ring 10 are tightened to the greatest degree.

This assists in reliable fixation of the tyre on the rim 1 and prevents its turning about this rim.

In a tubeless tyre the tension in the middle zone of the bases 11 of its beads 8 provides for hermetic sealing of the tyre and increases its life.

The making of the seating surfaces 12 of the rim 1 is the form of toroidal rollers eliminates turn of the noses 17 of the bases 11 of the tyre flanges which takes place in the case of conical seating surfaces 11.

This fact considerably facilitates dismantling of the wheel.

We claim:

1. A tire and wheel assembly, comprising, in combination: a pneumatic tire having a peripheral tread portion, and side wall portions including peripheral beads extending about the radially inner free ends thereof, said beads having base and heel surfaces; and carcass rings positioned within each of said beads; and a wheel rim, said wheel rim including a peripheral surface having side flanges each engaged by respectively one of the beads of said tire, seating surfaces adjoining said side flanges being contacted by the base surfaces of said tire beads, said seating surfaces being formed as convex rollers having apices positioned in alignment with the center portions of said bead base surfaces intermediate adjacent of said carcass rings, said convex rollers having sloping surfaces extending toward said side flanges gradually forming annular recesses adapted to be engaged by the heel surfaces of said tire beads.

2. An assembly as claimed in claim 1, said rollers being toroidally-shaped.

* * * * *